United States Patent
Hoashi et al.

[19]

[11] Patent Number: 5,870,684
[45] Date of Patent: Feb. 9, 1999

[54] RADIO COMMUNICATION APPARATUS WITH ADJUSTABLE ALERT TONE

[75] Inventors: Yuki Hoashi; Kimura Misa, both of Tokyo, Japan

[73] Assignee: NEC Corporation, Tokyo, Japan

[21] Appl. No.: 774,208

[22] Filed: Dec. 27, 1996

[30] Foreign Application Priority Data

Dec. 29, 1995 [JP] Japan ..................................... 7-354186

[51] Int. Cl.$^6$ ..................................................... H04Q 1/00
[52] U.S. Cl. ............................. 455/567; 455/73; 455/575
[58] Field of Search ..................... 340/825.46; 455/38.2, 455/567, 73; 379/106 F

[56] References Cited

U.S. PATENT DOCUMENTS

| | | |
|---|---|---|
| 5,025,467 | 6/1991 | Wheller ..................................... 379/60 |
| 5,471,204 | 11/1995 | Kudoh et al. . | |
| 5,696,497 | 12/1997 | Mottier et al. ..................... 340/825.44 |

FOREIGN PATENT DOCUMENTS

| | | |
|---|---|---|
| 0 493 973 A1 | 7/1992 | European Pat. Off. . |
| 0 507 482 A2 | 10/1992 | European Pat. Off. . |
| 63-187433 | 11/1988 | Japan . |
| 4-56536 | 2/1992 | Japan . |

*Primary Examiner*—Dwayne D. Bost
*Assistant Examiner*—Leonard Baker
*Attorney, Agent, or Firm*—Scully, Scott, Murphy & Presser

[57] ABSTRACT

In a radio communication apparatus, a counter is reset to its initial state if the user of the apparatus responds to an alert tone representative of call incoming, or caused to count the number of times of call incoming if the user does not respond. The number of times of call incoming occurred without any user's response and a reference value are compared. If the number of times counted and reference value compare equal, the volume of the alert tone is increased for the current call incoming or for the next call incoming. Further, If the user does not respond to the call incoming, a timer starts counting time. When call incoming is repeated within a preselected period of time, the volume of the alert tone is increased. Loudening the alert tone may be replaced with changing the pattern of the alert tone.

6 Claims, 8 Drawing Sheets

RADIO COMMUNICATION APPARATUS WITH ADJUSTABLE ALERT TONE

BACKGROUND OF THE INVENTION

The present invention relates to a handy phone or similar radio communication apparatus capable of controlling the volume of an alert tone and, more particularly, to a radio communication apparatus capable of reporting an unusual situation happened to the user of the apparatus to those around the user.

A value-added alert tone to be output on the receipt of a call is important with a handy phone, a slave unit included in a cordless telephone system, a mobile phone, a wireless microphone or similar radio communication apparatus. The value-added alert tone promotes the users's convenience as to the handling of the phone and allows the phone to adapt itself to the varying environment. Radio communication apparatuses with improved control over the alert tone are taught in, e.g., Japanese Patent Laid-Open Publication Nos. 4-56536 (document 1) and 63-187433 (document 2). However, the conventional value-added alert tone schemes have some problems left unsolved, as follows.

One of the conventional schemes measures a noise level around the apparatus, and then determines the volume of the alert tone matching the measured noise level. Although this kind of scheme successfully alerts the user to an incoming call in a noisy environment, it does not work when the alert tone must be loudened despite a quiet environment. For example, when the apparatus is put in the user's bag and buried in other various goods, it is likely that the user does not notice the alert tone. In such a case, the volume of the alert tone cannot be increased because the noise level in the bag is usually extremely low.

Another conventional scheme sequentially increases the alert tone with the elapse of time during a single call incoming from, e.g., a base station in a handy phone system, calling the user's attention little by little. However, the time when the caller gives up calling and hangs up depends on the person. If the caller calls the same apparatus repeatedly, but hangs up soon each time, then call incoming always fails before the alert tone of the apparatus is loudened. This practically prevents the apparatus from calling the user's attention.

SUMMARY OF THE INVENTION

It is therefore an object of the present invention to provide a radio communication apparatus capable of promoting the user's convenience and sure alert, and in addition capable of reporting the unusual situation happened to persons around the user.

In accordance with the present invention, a radio communication apparatus outputs an alert tone having a first volume via a speaker in the event of call incoming from a base station. A counter is reset to its initial state if the user of the apparatus responds to the call incoming, or is caused to count the number of times of call incoming if the user does not respond to the call incoming. A memory stores a reference value representative of a preselected number of times of call incoming beforehand. A controller compares a count output from the counter and the reference value, and if they compare equal, increases the volume of an alert tone from a first volume to a second volume for the current call incoming or the next call incoming, and feeds the alert tone of the second volume to a speaker.

The apparatus may additionally include a timer which is reset to its initial state if the user responds to the incoming call, or is caused to start counting time and output a time if the user does not respond to the incoming call;. In this case, the memory stores a first reference value representative of a preselected number of times of call incoming and a second reference value representative of a preselected time interval beforehand. The controller compares a count output from the counter and the first reference value, and if they compare equal, increases the volume of the alert tone from the first volume to the second volume for the current call incoming or the next call incoming, and feeds the alert tone to a speaker. In addition, the controller compares the time output from the timer and the second reference value, and if they compare equal, stops comparing the count and causes the counter and time to stop operating, and restores the alert tone to the first volume. Further, the controller may change the pattern of the alert tone while loudening it.

BRIEF DESCRIPTION OF THE DRAWINGS

The above and other objects, features and advantages of the present invention will become apparent from the following detailed description when taken with the accompanying drawings in which.

In the figures, identical reference numerals denote identical structural elements.

DETAILED DESCRIPTION OF THE PREFERRED EMBODIMENTS

Figure 1:
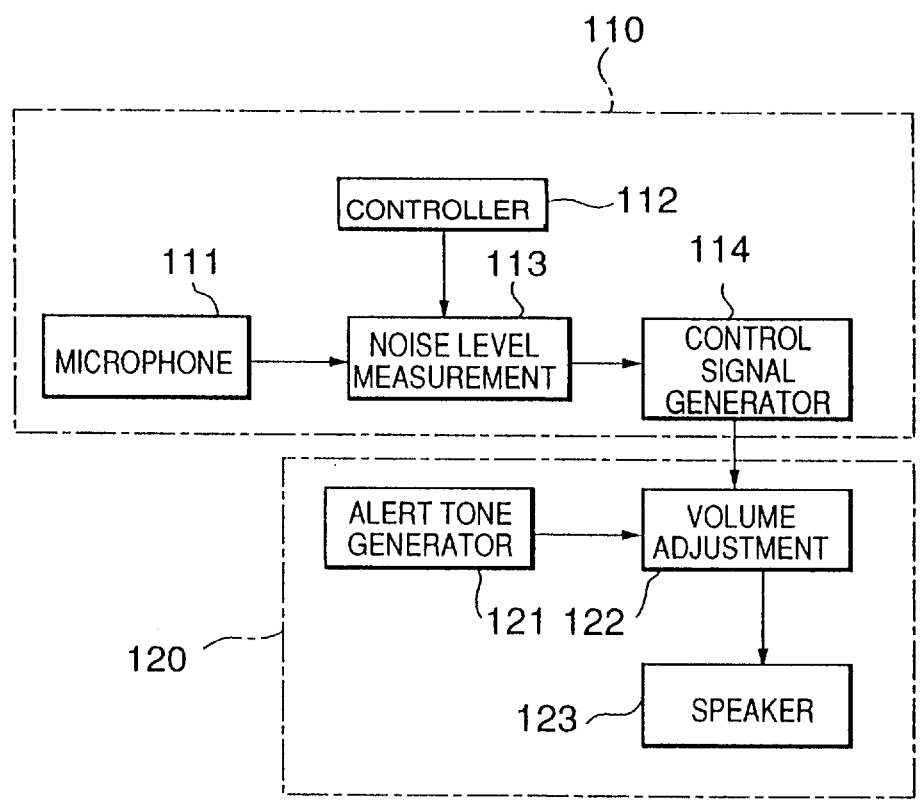
FIGS. 1 and 2 each shows a particular conventional radio communication apparatus.

To better understand the present invention, a brief reference will be made to a conventional radio communication apparatus of the type taught in the previously mentioned document 1. As shown in FIG. 1, the conventional apparatus includes noise sensing means 110 and alert tone loudening means 120. The noise sensing means 110 senses a noise level around the apparatus and generates a control signal based on the noise level. The alert tone loudening means 120 increases the volume of an alert tone in response to the control signal. With these means 110 and 120, the apparatus is capable of loudening the alert tone in a noisy environment.

The noise sensing means 110 includes a microphone 111 for transforming noise around the apparatus to a corresponding electric signal. A controller 112 outputs a sampling signal at predetermined intervals while the apparatus is in a stand-by state. A noise level measurement 113 samples the above electric signal in synchronism with the sampling signal output from the controller 112, digitizes the electric signal, and thereby determines the varying noise level. A control signal generator 114 produces a mean value from the output of the measurement 113 and a reference value, and generates a control signal corresponding to the means value.

The alert tone loudening means 120 includes an alert tone generator 121 for generating an electric signal representative of an alert tone. A volume adjustment 122 adjusts the electric signal output from the alert tone generator 121 in accordance with the control signal output from the control signal generator 114. A speaker 123 outputs the alert tone adjusted by the adjustment 122.

Figure 2:
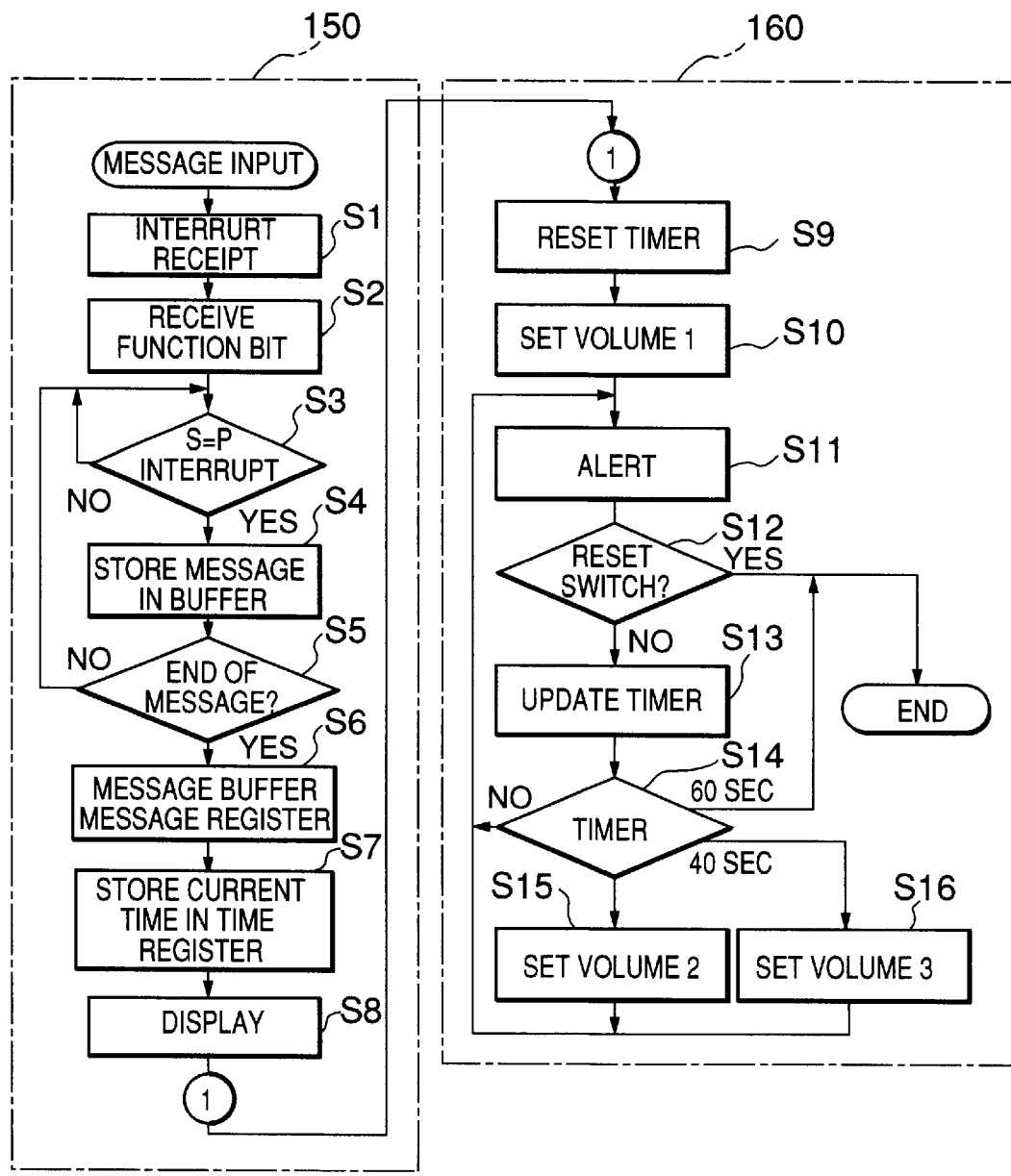

FIG. 2 shows a flowchart representative of the procedure disclosed in the document 2 and relating to a pager. As shown, the procedure is generally made up of a first stage 150 for receiving and displaying a message, and a second stage 160 for sequentially loudening an alert tone with the elapse of time. The alert tone is loudened little by little during a single call incoming.

At the first stage 150, the pager identifies an identification (ID) number assigned thereto and included in a received signal, and starts call incoming processing (steps S1 and S2). Then, the pager receives a message and stores it in a memory (steps S3–S6). Subsequently, the pager displays the message together with the time of receipt (steps S7 and S8). At the second stage 160, the pager starts a timer while producing an alert tone of usual volume (steps S9–S11). If the user of the pager does not respond to the alert tone, the pager sequentially loudens the tone while updating the timer (steps S12–S16).

The conventional schemes described above have some problems left unsolved, as discussed earlier.

Figure 3:
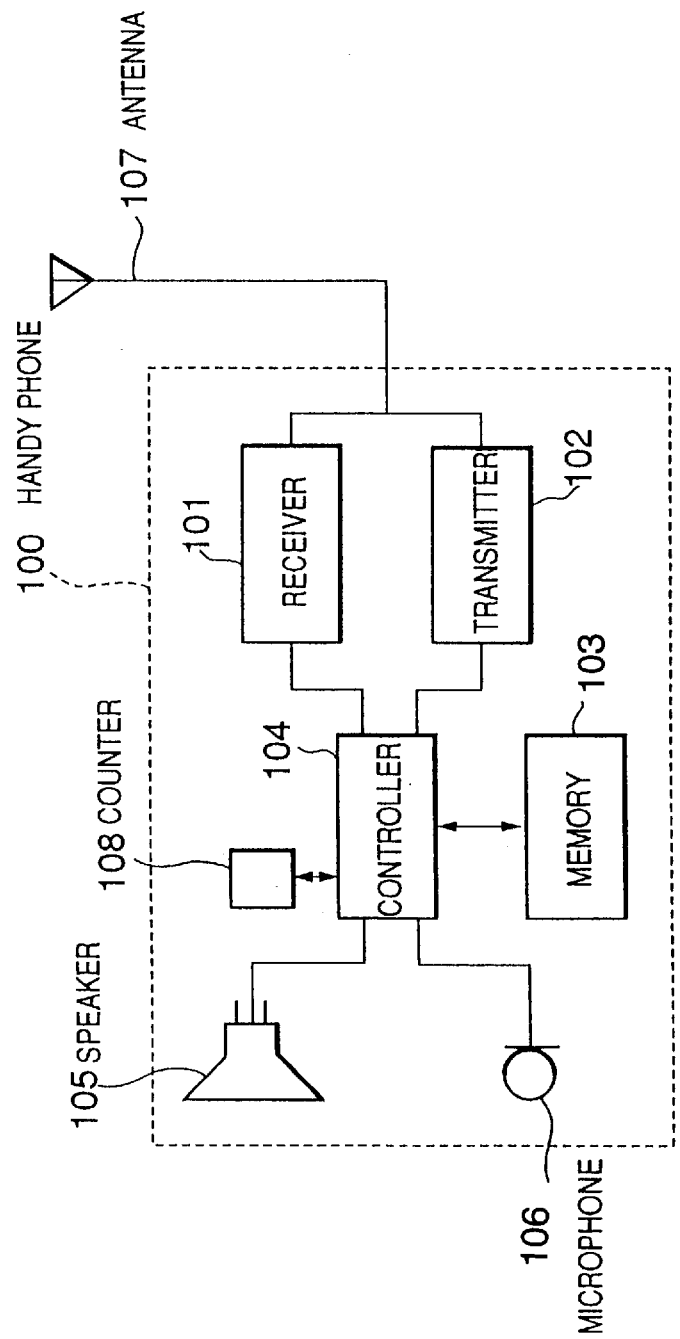
FIG. 3 is a block diagram schematically showing a radio communication apparatus embodying the present invention.

Referring to FIG. 3, a radio communication apparatus embodying the present invention is shown and implemented as a handy phone by way of example. As shown, the handy phone, generally 100, includes a receiver 101 for receiving a radio signal from a base station, and a transmitter 102 for sending a radio signal to a base station. A memory 103 stores a telephone number assigned to the phone 100 and various numerical values necessary for the control of the phone 100 and including a first reference value which will be described. A controller 104 controls the receiver 101, transmitter 102, memory 103, etc. A speaker 105 outputs a speech signal. A speech signal is input to a microphone 106. A radio signal is received from or sent to the base station via an antenna 107. A call incoming counter 108 counts the number of times of call incoming.

The controller 104 receives the number of times of call incoming from the counter 108, and controls the entire phone 100 by controlling the call incoming, transmission, receipt, etc. When a call meant for the phone 100 is received from a base station, the counter 108 is incremented by 1 (one) to count the incoming call meant for the user of the phone 100. If the user responds to the call, the counter 108 is reset while feeding the number of times of receipt (once in this case) to the controller 104 as a second count.

The receiver 101, transmitter 102, speaker 105, microphone 106 and antenna 107 each has a conventional construction and will not be described specifically.

A reference will be made to FIG. 4 for describing a specific operation of the illustrative embodiment. Briefly, the specific operation is such that when the user of the phone 100 does not respond to a call received twice continuously by the phone 100, an alert tone is output with its maximum volume for the third and successive call incoming. In this case, two consecutive times of call incoming is the first reference value that allows the user to perform no operation in response to the call. A value N to be set in the counter 108 is selected to be "2" beforehand.

Figure 4:
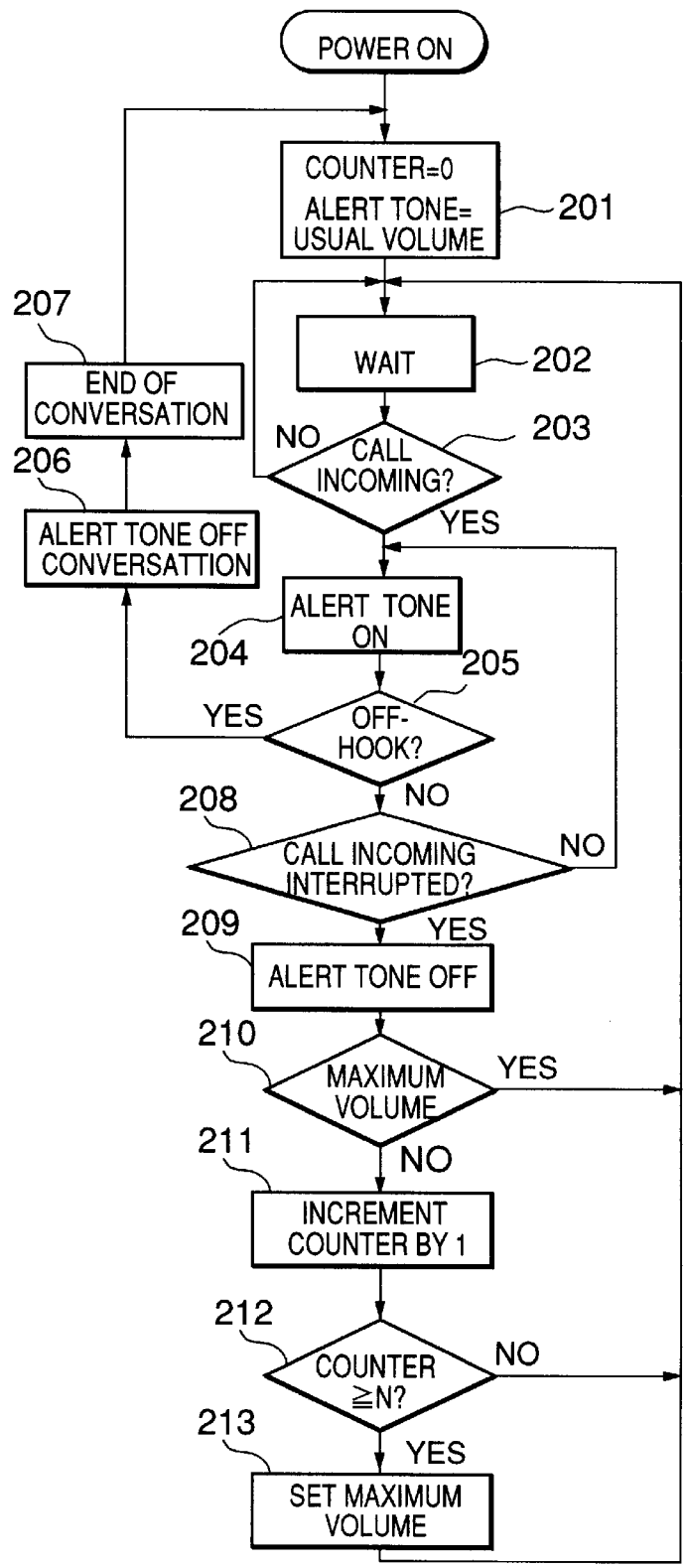
FIGS. 4 and 5 are flowcharts each demonstrating a specific operation of the embodiment.

As shown in FIG. 4, when the user of the phone 100 turns on a power switch provided on the phone 100, the counter 108 is reset to its initial value, i.e., zero while an alert tone of usual volume is set (step 201). In this condition, the phone 100 waits for call incoming (step 202). When a call incoming signal from a base station is detected (Y, step 203), the alert tone of usual volume is output (step 204). Then, whether or not the user has responded to the call (off-hook) is determined (step 205).

If the user has responded to the call (Y, step 205), the alert tone is stopped, and conversation is held on the phone 100 (step 206). When the user ends the conversation and releases the channel (step 207), the program returns to the step 201. If the user does not respond to the call (N, step 205), whether or not the call incoming has been interrupted is determined (step 208). If the call incoming has not been interrupted (N, step 208), the program returns to the step 204 in order to output the alert tone continuously. If otherwise (Y, step 208), the alert tone is stopped, and then whether or not the volume of the alert tone is maximum is determined (step 210). The step 210 is included in order to execute receipt processing rapidly when the volume is maximum. Therefore, the step 210 is not necessary if the period of time necessary for the steps 211, 212 and 213 does not have to be reduced, or if the volume is varied in three or more consecutive steps, or if the number of times of call incoming is used for another purpose also.

If the volume of the alert tone is not maximum (N, step 210), the counter 108 is incremented by 1 (step 211). If otherwise (Y, step 210), the operation returns to the step 202.

After the counter 108 has been incremented by 1 in the step 211, its content is compared with the first reference value N=2 (step 212). If the content of the counter 108 is 1 or less (N, step 212), the operation returns to the step 202 immediately. If the content is 2 or above (Y, step 212), the alert tone of maximum volume is set for the subsequent call incoming (step S213). Subsequently, the program returns to the step 202.

Of course, the number of times of call incoming which allows the user to leave the phone 100 on-hook is open to choice. While the illustrative embodiment varies the volume of the alert tone on the receipt of a call after the preselected number of times of call incoming, the pattern of the alert tone may be replaced with, e.g., a pattern representative of the sound of a siren or that of an alarm bell.

Figure 5:
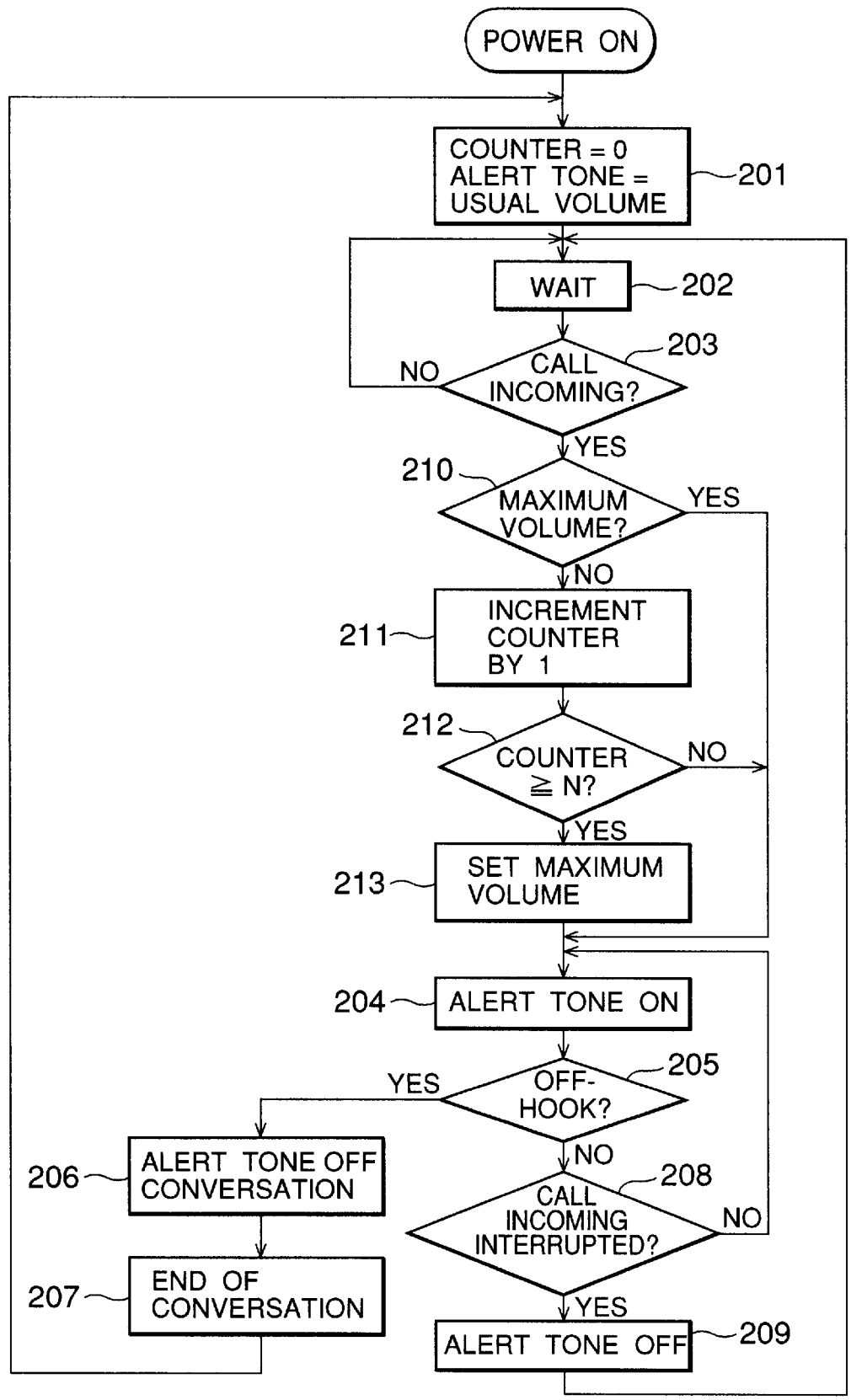

Another specific operation of the above embodiment is shown in FIG. 5. As shown, the operation is identical with the operation shown in FIG. 4 except that the steps 210 and 213 are inserted between the steps 203 and 204. In this case, three times of call incoming is the first reference value, and the number N to be set in the counter 108 is selected to be "3" beforehand. This specific operation is available only if the interval between the decision on call incoming (step 203) and the decision on the user's response (step 205) is not questionable. If the above interval should be reduced, then the operation shown in FIG. 4 is advantageous over the operation shown in FIG. 5.

Figure 6:
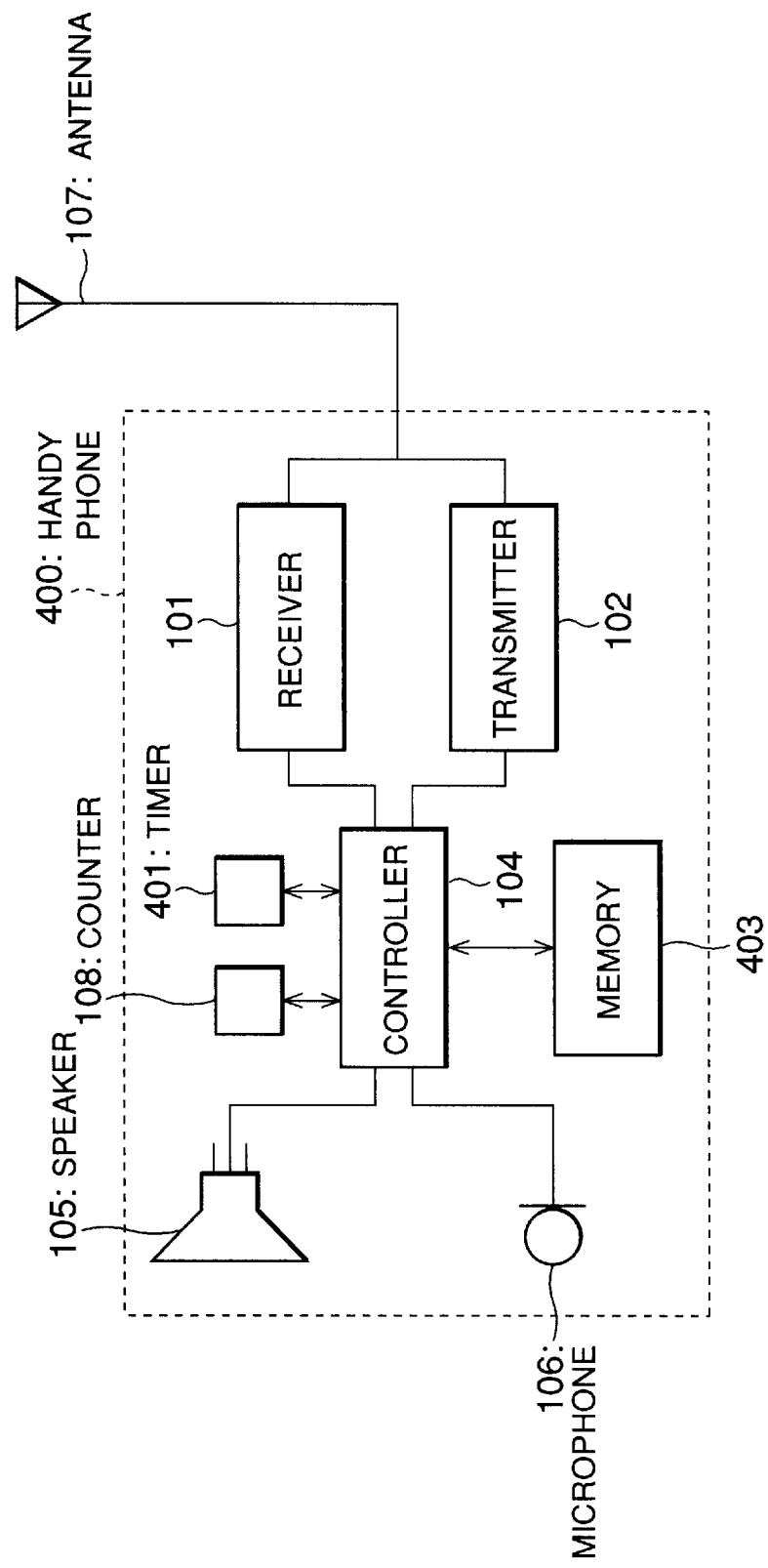
FIG. 6 is a block diagram schematically showing an alternative embodiment of the present invention.

Referring to FIG. 6, an alternative embodiment of the present invention will be described. As shown, a radio communication apparatus, generally 400, is also implemented as a handy phone. The phone 400 additionally includes a timer 401 for counting an interval between consecutive call incoming and during which the user does not respond to a call. The timer 401 is connected to the controller 104 in parallel with the counter 108. The memory 103 is replaced with a memory 403 capable of storing a second reference value, which will be described, in addition to the first reference value. The controller 104 additionally receives the time of receipt of a call from the timer 401. When the phone 400 receives a call and if the user responds to the call, the timer 401 is initialized. If the user does not respond to the call, the timer 401 starts counting time and reports the counted time to the controller 104 as a second count.

A specific operation of the alternative embodiment will be described with reference to FIG. 7. Briefly, the specific operation is such that if the user of the phone 400 does not respond to either the first call terminated at the phone 400 or the second call terminated within 10 minutes since the first call, the alert tone is output with the maximum volume for the third and successive calls. In this case, the number of times of call incoming which allows the user to leave the phone 400 on-hook, i.e., the first reference value is "2", and the value N to be loaded in the counter 108 is selected to be ""2" beforehand. Likewise, a second reference value allowable is 10 minutes, and a value M to be loaded in the timer 401 is selected to be "10" beforehand.

Figure 7:
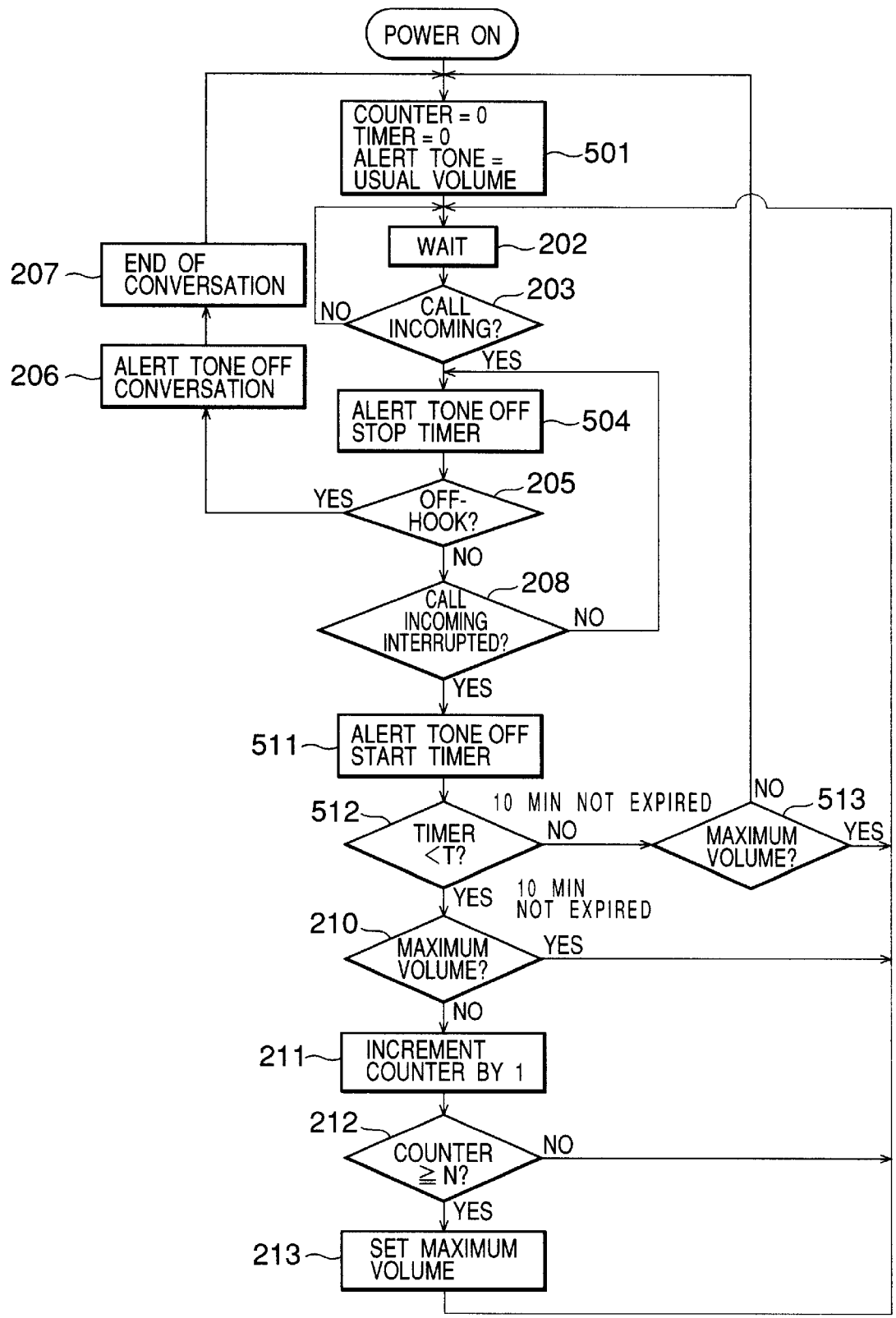
FIGS. 7 and 8 are flowcharts each demonstrating a specific operation of the alternative embodiment.

As shown in FIG. 7, when the user of the phone 400 turns on a power switch provided on the phone 400, the counter 108 and timer 401 are each reset to its initial value, i.e., zero while an alert tone of usual volume is set (step 501). This is followed by steps 202 and 203 identical with the steps 202 and 203 described with reference to FIG. 4. Then, the alert tone starts while the timer 401 stops counting time (step 504). The step 504 is followed by the steps 205–208 shown in FIG. 4. If the call incoming is interrupted (Y, step 208), the alert tone stops while the timer 401 starts counting time (step 511). The time counted by the timer 401 is compared with the second reference value (step 512). If the time counted by the timer 401 is greater than the second reference value (N, step 512), whether or not the alert tone has its maximum volume is determined (step 513). If the answer of the step 513 is positive (Y), the program returns to the step 202. If the answer of the step 513 is negative (N), the program returns to the step 501. If the time counted by the timer 401 is smaller than the second reference value (Y, step 512), the steps 210–213 shown in FIG. 4 are executed.

Figure 8:
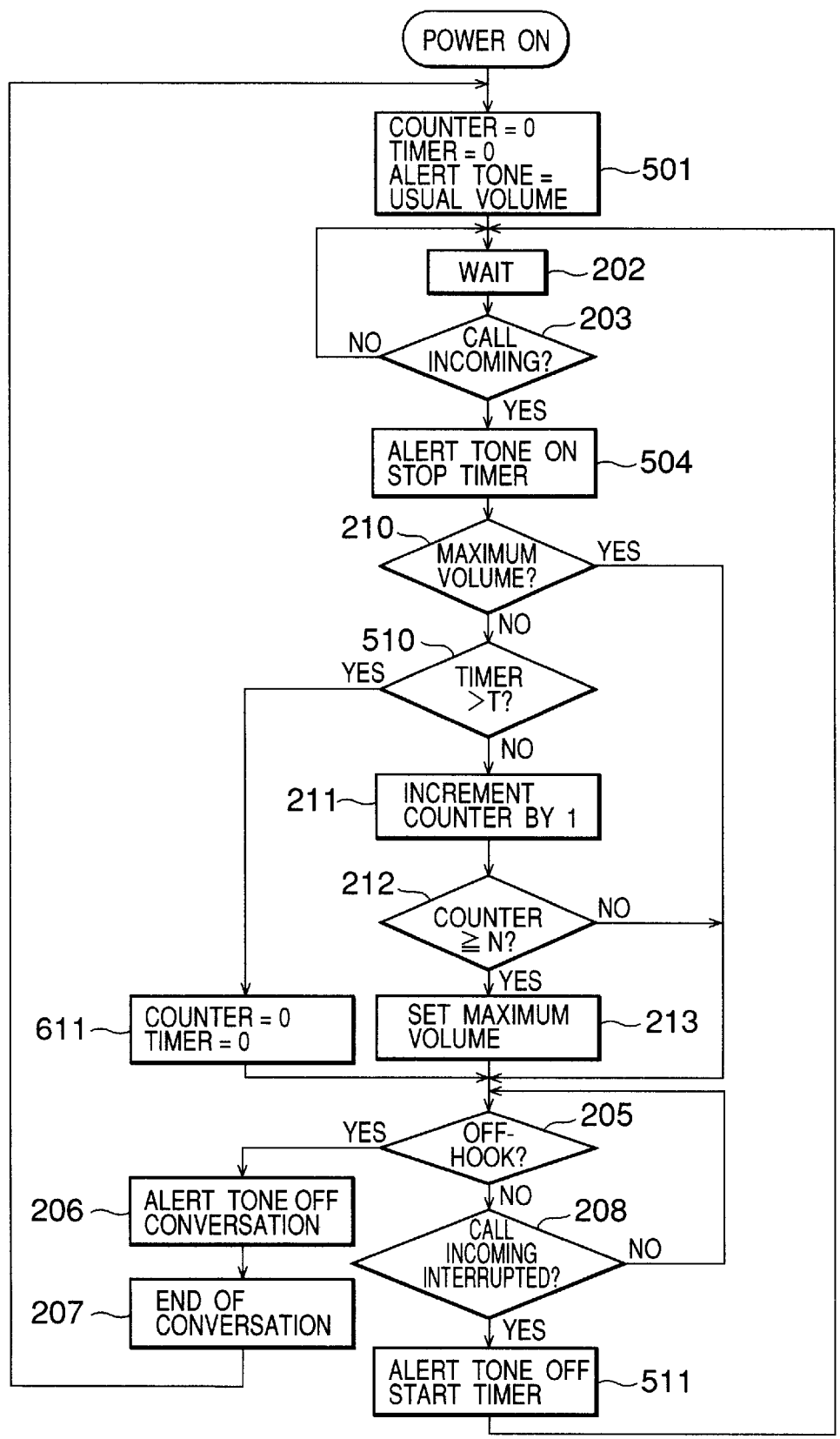

FIG. 8 demonstrates another specific operation of the alternative embodiment. As shown, the steps 501, 202, 203, 504, 210, 510 and 211–213 shown in FIG. 7 are sequentially executed. If the time counted by the timer 401 is greater than the second reference value (Y, step 510), both the counter 108 and the timer 401 are reset to zero (step 611). That is, if the answer of the step 210 is Y, or if the answer of the step 210 is N, or after the step 213 or 611, the steps 205–207, 208 and 511 shown in FIG. 7 are executed. In this manner the volume of the alert tone is determined just after the call incoming. This kind of procedure is available if, e.g., it is not necessary to reduce the interval between the decision on call incoming (step 203) and the decision on the operator's response (step 205). The procedure shown in FIG. 7 is advantageous over the above procedure if the interval must be reduced.

In summary, it will be seen that the present invention provides a radio communication apparatus having various unprecedented advantages, as follows. A call incoming counter is built in the apparatus and allows an alert tone to be loudened when a call is received a predetermined number of times. Therefore, even when the apparatus is held in an unusual condition, e.g., put in the user's bag and buried in other various goods, the apparatus produces an alert tone of volume great enough to alert the user or persons around the user. Further, a call incoming timer is built in the apparatus and allows the alert tone to be loudened when a call is received a preselected number of times within a preselected period of time. This not only alerts the user in case of emergency, i.e., when a call is repeatedly received within a short period of time, but also frees the user from excessive care in other cases. Consequently, the apparatus surely alerts the user to an incoming call while promoting the user's convenience, and in addition reports the user's unusual condition to those around the user.

Various modifications will become possible for those skilled in the art after receiving the teachings of the present disclosure without departing from the scope thereof. For example, the period of time for setting the volume of the alert tone and the number of times of call incoming may be set by the user, as desired, and may be so selected as to render the apparatus generally applicable to various kinds of environments and business conditions. Further, the user of the apparatus may intentionally restrict call incoming. For example, the alert tone of usual volume, i.e., before being loudened may be replaced with silence.

What is claimed is:

1. A radio communication apparatus comprising:

a counter reset to an initial state if a user of said apparatus responds to call incoming, or caused to count a number of times of call incoming if the user does not respond to the call incoming;

a memory storing a reference value representative of a preselected number of times of call incoming beforehand; and a controller for comparing a count output from said counter and said reference value, and if said count and said reference value compare equal, increasing a volume of an alert tone from a first volume to a second volume for current call incoming or next call incoming, and feeding the alert tone of said second volume to a speaker.

2. A radio communication apparatus comprising:

a counter reset to an initial state if a user of said apparatus responds to call incoming, or caused to count a number of times of call incoming if the user does not respond to the incoming call;

a timer reset to an initial state if the user responds to the incoming call, or caused to start counting time and outputting a time if the user does not respond to the incoming call;

a memory storing a first reference value representative of a preselected number of times of call incoming and a second reference value representative of a preselected time interval beforehand; and a controller for comparing a count output from said counter and said first reference value, and if said count and said reference value compare equal, increasing a volume of an alert tone from a first volume to a second volume for current call incoming or next call incoming, and feeding the alert tone of said second volume to a speaker, and for comparing the time output from said timer and said second reference value, and if said time and said second reference value compare equal, stopping comparing said count and causing said counter and said time to stop operating, and restoring the alert tone to said first volume.

3. An apparatus as claimed in claim 1, wherein after increasing the volume to said second volume, said controller restores the alert tone to said first volume if the user responds to the call incoming.

4. An apparatus as claimed in claim 1, wherein said controller changes a pattern of the alert tone while increasing the volume to said second volume.

5. A method of controlling an alert tone of a radio communication apparatus, comprising the steps of:

restoring an initial state if a user of said apparatus responds to an incoming call, or counting a number of times of call incoming and outputting a count if the user does not respond to the incoming call; and comparing a count output from said counter and a preselected number of times of call incoming, and if said count and said preselected number of times compare equal, increasing a volume of an alert tone from a first volume to a second volume for current call incoming or next call incoming, and driving a speaker with the alert tone of said second volume.

6. A method of controlling an alert tone of a radio communication apparatus, comprising the steps of:

restoring an initial state if a user of said apparatus responds to call incoming call, or counting a number of times of call incoming and outputting a count if the user does not respond to the incoming call;

restoring an initial state if the user of said apparatus responds to the call incoming, or starting counting time if the user does not respond to the call incoming;

comparing the count output from said counter and a preselected number of times of call incoming, and if said count and said preselected number of times compare equal, increasing a volume of an alert tone from a first volume to a second volume for current call incoming or next call incoming, and driving a speaker with the alert tone of said second volume, and for comparing the time output from said timer and a preselected time, and if said time and said preselected time compare equal, stopping comparing said count and stopping counting the number of times of call incoming and the time, and restoring the alert tone to said first volume.

* * * * *

UNITED STATES PATENT AND TRADEMARK OFFICE
CERTIFICATE OF CORRECTION

PATENT NO.    : 5,870,684
DATED         : February 9, 1999
INVENTOR(S)   : Hoashi et al.

It is certified that error appears in the above-identified patent and that said Letters Patent is hereby corrected as shown below:

<u>Title page,</u>
Item [56], add the following:
--      FOREIGN PATENT APPLICATION
        S50-081711    7/2/75       Japan
        S62-139157    6/33/87      Japan
        S63-146543    6/18/88      Japan
        S63-200653    6/18/88      Japan
        H01-286657    11/17/89     Japan
        H02-28160     1/30/90      Japan
        H02-112049    4/24/90      Japan
        H04-88740     3/23/92      Japan
        H372250       12/25/92     Japan
        H06-268300    10/15/93     Japan --

Signed and Sealed this

Second Day of July, 2002

Attest:

Attesting Officer

JAMES E. ROGAN
*Director of the United States Patent and Trademark Office*